United States Patent
Nelson et al.

(10) Patent No.: US 6,192,048 B1
(45) Date of Patent: Feb. 20, 2001

(54) METHOD AND APPARATUS FOR IMPLEMENTING HUNT GROUP SUPPORT FOR A CROSSPOINT CONTROLLER

(75) Inventors: Jeffrey J. Nelson, Louisville; James P. Fugere, Boulder; Ken N. Jessop, Arvada, all of CO (US)

(73) Assignee: McData Corporation, Broomfield, CO (US)

( * ) Notice: Under 35 U.S.C. 154(b), the term of this patent shall be extended for 0 days.

(21) Appl. No.: 08/942,506

(22) Filed: Oct. 2, 1997

(51) Int. Cl.$^7$ .................................................. H04L 12/50
(52) U.S. Cl. .................................................. 370/380
(58) Field of Search .............................. 370/351, 357, 370/359, 362, 366, 370, 380, 427; 340/825.79, 825.83; 379/272, 273, 274

(56) References Cited

U.S. PATENT DOCUMENTS

| | | |
|---|---|---|
| 4,689,815 | 8/1987 | Grewal et al. |
| 4,720,854 | 1/1988 | Sand. |
| 5,107,489 | 4/1992 | Brown et al. ............... 370/58.2 |
| 5,265,257 * | 11/1993 | Simcoe et al. ............... 395/725 |
| 5,418,967 * | 5/1995 | Simcoe et al. ............... 395/725 |
| 5,544,168 * | 8/1996 | Jeffrey et al. ............... 370/60.1 |
| 5,566,171 * | 10/1996 | Levinson ............... 370/60.1 |
| 5,604,735 * | 2/1997 | Levinson et al. ............... 370/360 |
| 5,774,067 * | 6/1998 | Olnowich et al. ............... 340/827 |
| 5,796,966 * | 8/1998 | Simcoe et al. ............... 395/311 |
| 5,905,723 * | 5/1999 | Varghese et al. ............... 370/351 |
| 5,991,296 * | 11/1999 | Mu et al. ............... 370/380 |

OTHER PUBLICATIONS

McDATA Corporation, *Information is the Lifeblood of Your Success. Fibre Channel Switching Is the Pulse*, 1997.
McDATA Corporation, *LinkMaster 9191 ESCON Multiport Repeater*, 1993, 1994.
IBM, *ESCON Director Model 3*, 1994.
Fibre Channel Association, *Fibre Channel Quick Reference Card*, 1997.
IBM, *ESCON Director Model 4 (9033) for ESCON Architecture*, 1995.

* cited by examiner

*Primary Examiner*—Chau Nguyen
*Assistant Examiner*—Enrique L Santiago
(74) *Attorney, Agent, or Firm*—Richard A. Bachand

(57) ABSTRACT

A method and apparatus which obviates the throughput limitations retries generated by busy conditions of conventional switches which are limited to but a single path between any two ports through the use of a "hunt group" concept whereby multiple paths can be provided between a participating group member and another port. These multiple paths may be associated in groups of, for example, eight, with each grouping of eight paths then comprising a "hunt group" whereby the first available member of the hunt group will be selected to enable the connection should the first be "busy". The particular embodiment disclosed comprises a plurality of sequentially organized hunt groups starting on a boundary of eight associated with ports 0–7, 8–15, . . . through 248–255.

27 Claims, 9 Drawing Sheets

METHOD AND APPARATUS FOR IMPLEMENTING HUNT GROUP SUPPORT FOR A CROSSPOINT CONTROLLER

BACKGROUND OF THE INVENTION

The present invention relates, in general, to the field of methods and apparatus for implementing hunt group support for a crosspoint controller. More particularly, the present invention relates to a method and apparatus for implementing hunt group support for a crosspoint controller within an Enterprise Systems Connection switch ("ESCON™" is a trademark of International Business Machines Corporation).

Current approaches, such as those used in the ESCON Director series of point-to-point switches provide only a single path between any source and destination port. In other words, there is a one-to-one association between an attaching port and the paths to all other ports within the switch. This architecture limits the routing between any two physical ports to one, and only one, path through the switch. As such, the particular path must be available (that is, neither port can be busy) for a connection to be established between the source and destination ports, and a "busy" condition at either the source or destination port will deny the connection from being established and force the requesting device attached to the port to retry the connection request. U.S. Pat. No. 5,107,489 describes a typical ESCON switch and port states in more detail, the disclosure of which is herein incorporated by this reference.

The present ESCON Director configurations utilize a dual-ported 256 bit busy array with the one-to-one relationship of a single busy bit associated with a single port. Busy bits are associated with the physical source/destination port number ("PNUM") and during a connection request, two bits of the busy bit array are accessed, one associated with the source of the connection request ("SRC_PORT") and the other associated with the destination ("DST_PORT"). These bits represent the state of each port, and if a connection can be made, then the busy bits addressed by the source and destination port numbers are updated to reflect the new "busy" condition. The individual ports thereafter return a "clear" pulse to the associated busy bits upon termination of the connection.

SUMMARY OF THE INVENTION

The method and apparatus of the present invention overcomes the significant throughput limitation of conventional approaches limited to a single path between any two ports. Through the use of a "hunt group" concept within the busy bit array, multiple paths can be provided between a participating group member and another port. This function significantly increases the likelihood of a port getting a connection established on the first request, thereby providing a performance increase by reducing the number of retries generated by busy conditions. This is effectuated by elimination of the one-to-one relationship of a given path between source and destination ports through the crosspoint switch.

In the embodiment disclosed herein, multiple paths through the crosspoint switch are provided for a given port and are associated in groups of, for example, eight. Each grouping of eight paths then comprise a "hunt group" and the first available member of the hunt group will be selected to enable the connection should the first be "busy". All paths within the hunt group share the same attributes such that if one path is prohibited from making connections to another port then all paths in the hunt group will be likewise prohibited. The embodiment shown herein comprises a plurality of sequentially organized hunt groups starting on a boundary of eight associated with ports 0–7, 8–15, . . . through 248–255. The method and apparatus of the present invention will support a source port hunt group connection to a destination port, a source port connection to a destination port hunt group as well as a source port to destination port connection although hunt group to hunt group connection requests may be implemented utilizing, for example, a two-dimensional array or content addressable memory ("CAM") for the connection lookup table.

Disclosed herein is a method and apparatus for implementing hunt group support for a crosspoint controller in which an attribute is defined that identifies either a destination or a source as belonging to a hunt group. In either instance, one or more bits may be utilized in this regard and, in the particular embodiment disclosed, a hardware information block attribute ("HIB") may be utilized in connection with a destination. In like manner, a single bit HIB could be utilized to identify the source.

In an implementation of the present invention for use in conjunction with an ESCON compliant switch, changes may be made to the busy bit array which include enlargement to a 256 bit array (as opposed to the present two 128 bit arrays) and tight coupling to the connect table (256 byte dual-ported memory). Additionally, logic for "Port Busy" and "Dialog-2" states may be included and provided as input to the decision logic. These indicators may be combined with the other attribute (HIB and prohibit dynamic connectivity mask "PDCM") and address checks to determine an appropriate response to a connection request.

In operation, the source and destination port number that are returned to the ports and the crosspoint switches are generated in additional decision logic based on hunt group attributes and responses. These values may include the requesting Source Port Number ("PNUM") and Destination Port Number, the output of the Destination Address to Port ("A2P") translation table indexed by the destination address ("DST_ADDR"). The setting of the busy bits and updating of the connection table may remain the same as in conventional ESCON switches using, for example, a connect response from the decision logic to perform operations. The operation of clearing the busy bits may also remain unchanged.

Particularly disclosed herein is a method for coupling a first data bus to a second data bus, wherein the first data bus is selectively couplable through a subset of a first plurality of ports to a first side of a crosspoint switch and a second side of the crosspoint switch is couplable to an available one of a second plurality of ports coupled to the second data bus. The method comprises the steps of: defining the subset of the first plurality of ports as a hunt group, identifying a first available port of the hunt group and coupling the first data bus through the first available port of the hunt group and the available one of the second plurality of ports to the second data bus.

Further disclosed herein is a crosspoint controller for coupling a first data bus to a second data bus. The controller comprises a switch having an input and output thereof. A plurality of input ports are coupled between the first data bus and the switch input. A subset of the plurality of input ports comprise a hunt group of member ports wherein the first data bus is coupled to the switch input through a first member port if available and alternatively through a next available member port. At least one output port is coupled between the switch output and the second data bus. The crosspoint controller may also comprise a plurality of output ports coupled between the switch output and the second data bus with a subset of the plurality of output ports comprising a hunt group of member ports. In this embodiment, the switch output is coupled to the second data bus through a first member port if available and alternatively through a next available member port. At least one input port is coupled between the first data bus and the switch input.

Still further disclosed herein is a method for coupling a first data bus to a second data bus through a source port to a destination port path. The method comprises the steps of: determining if either the source port or the destination port is a member of one of a plurality of predefined source and destination hunt groups respectively, coupling a first available member of the source hunt group to the destination port if the source port is a member of one of the plurality of predefined source hunt groups and coupling a first available member of the destination hunt group to the source port if the destination port is a member of one of the plurality of predefined destination hunt groups.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein.

DESCRIPTION OF A PREFERRED EMBODIMENT

Figure 1:
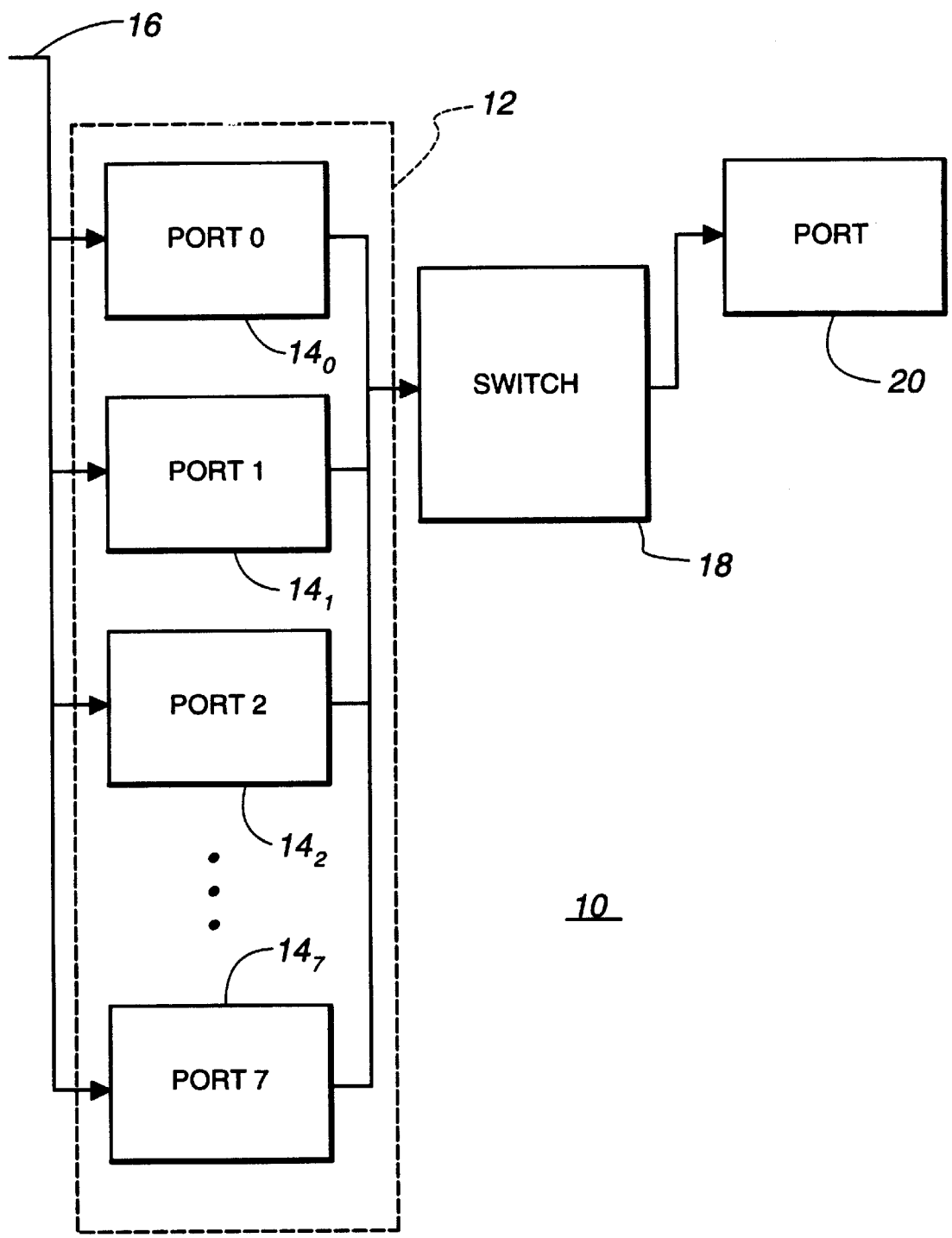
FIG. 1 is a simplified logic block diagram of an exemplary ESCON switching system implementing the method and apparatus for implementing hunt group support for a crosspoint controller in accordance with the present invention.

With reference now to FIG. 1, a crosspoint (or matrix) controller 10 in accordance with the present invention is shown. The crosspoint controller 10 provides multiple paths between a source and destination port through use of a "hunt group" selection process. This is in distinction to existing technology in which there is a one-to-one association between an attaching port and the path to all other ports.

The crosspoint controller 10 includes a base group 12 which includes, for example, eight ports $14_0$ through $14_7$ (PORT 0 through PORT 7) which may be coupled to a 1 gigabit input bus 16 in a particular embodiment described in more detail hereinafter. The switch 18 may comprise, for example, an ESCON Director Model 3 or 4 developed by McDATA Corporation, Broomfield, Colo., assignee of the present invention, for International Business Machines Corporation. The base group 12 and associated logic in conjunction with the switch 18 comprise the essence of the crosspoint switch 10. They enable the input bus 16 to be coupled to the port 20 through any of the eight available ports $14_0$ through $14_7$ as will be more fully described hereinafter. In operation, a simple algorithm may be employed to select the first available path between a hunt group of eight ports and a destination port. The crosspoint controller 10 of the present invention is operational to select the next available path and to determine whether each given path is available or busy.

In a preferred embodiment, the method and apparatus of the present invention may be implemented using Fibre Channel and frame multiplexing although other interconnect architectures and multiplexing techniques such as wave division multiplexing, time division multiplexing and the like may be used as well. Moreover, the crosspoint controller 10 may utilize a port connection process separate from the port disconnect process unlike conventional approaches wherein the destination port is responsible for initiating the disconnect. In the implementation of the method and apparatus of the present invention herein disclosed, each port is assigned the responsibility for disconnecting itself such that when a source port is informed that a destination port to which it has been connected has disconnected itself, it then releases itself to obviate the need for a "source port busy unconnected in contrast to conventional designs.

Conventional designs, in which there was only a single path between any source and destination ports, have heretofore used a single "busy bit" to indicate whether or not a particular port was "busy". Through the use of the crosspoint controller 10 of the present invention, source ports or destination ports may be part of a hunt group (for example, eight ports) and treated as a group. Through the implementation of a parallel process, the controller will check all busy bits to determine the first port in the hunt group that is available. Membership in a hunt group is indicated to the crosspoint controller 10 with respect to either the source or destination ports. In the particular implementation shown, hunt group to hunt group connections are not allowed to maintain a single busy bit array. However, if a two dimensional array or a CAM were used, such could be easily implemented in accordance with the method and apparatus of the present invention. In any event, should all eight ports in a hunt group be busy, there is then no path available until one of them becomes no longer busy.

The crosspoint controller 10 is implemented utilizing both port numbers and port addresses and the busy bits are associated with a particular port number while ESCON frames are associated with port addresses. Therefore, a source port requesting a connection provides three parameters to the crosspoint controller 10, the port number, source address, and destination address, the latter two being extracted from the frame data. In operation, when a source port raises a request, the port number is presented and a lookup table may be used to provide an indication as to whether or not the source is a member of a hunt group based on the port number. Similarly, the destination address is tested against a similar lookup table to determine if it is a member of a hunt group. A translation table may be used as described hereinafter to provide destination address-to-port number correspondence.

Figure 2A:
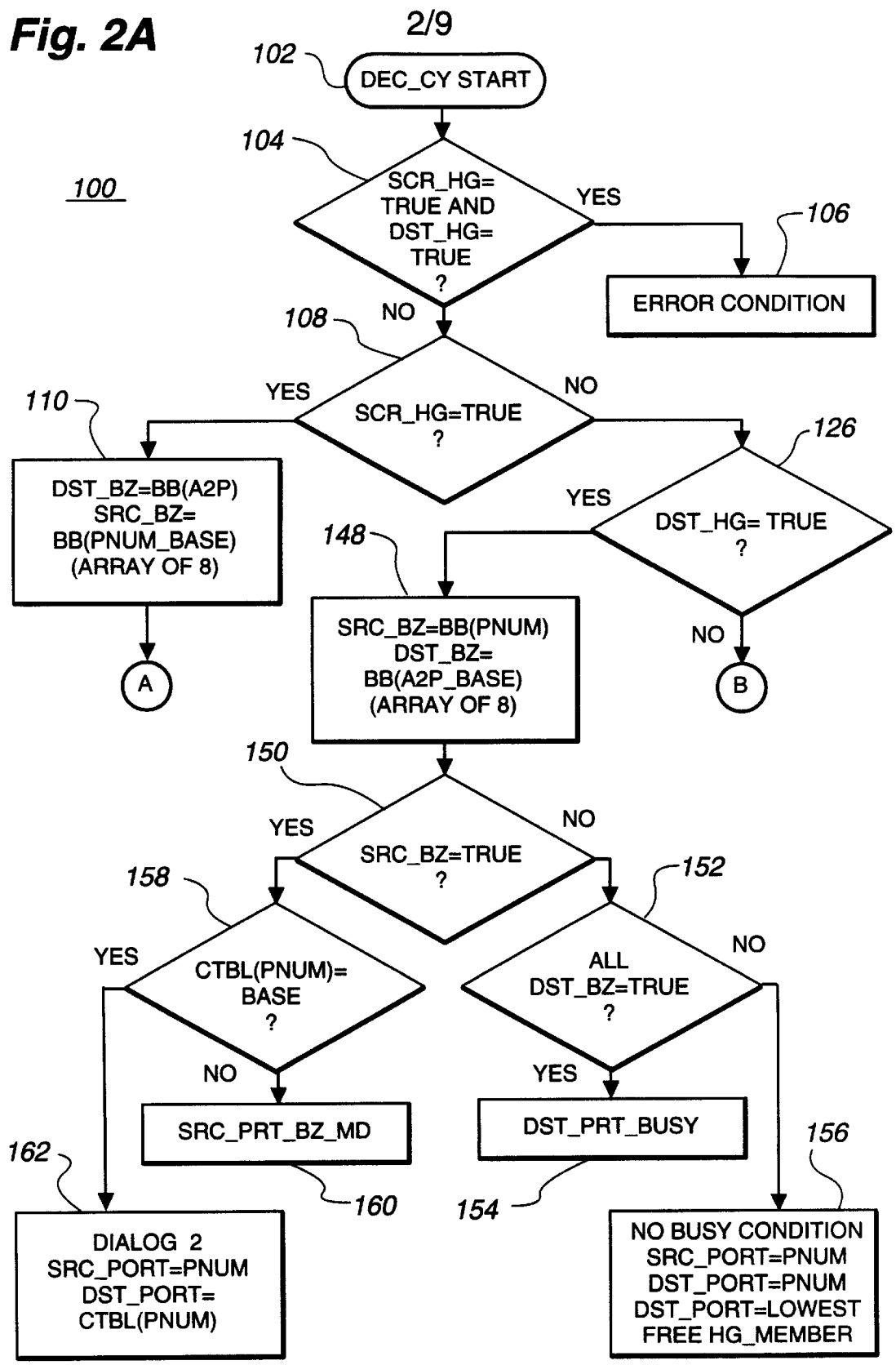
FIGS. 2A–2C illustrate a detailed logic flow chart for a possible implementation of a busy bit and connect table decision process in accordance with a particular embodiment of the present invention.
Figure 2B:
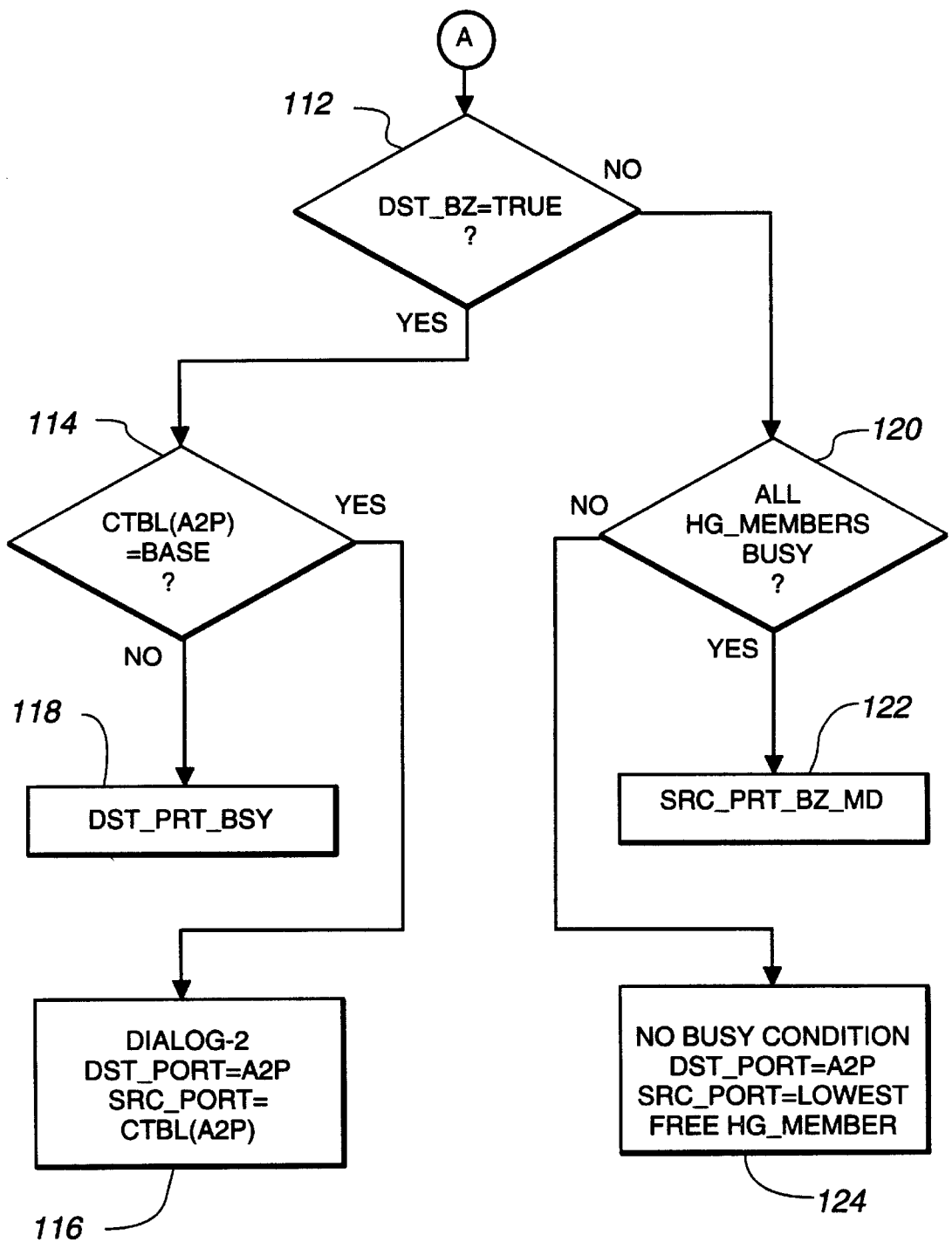
Figure 2C:
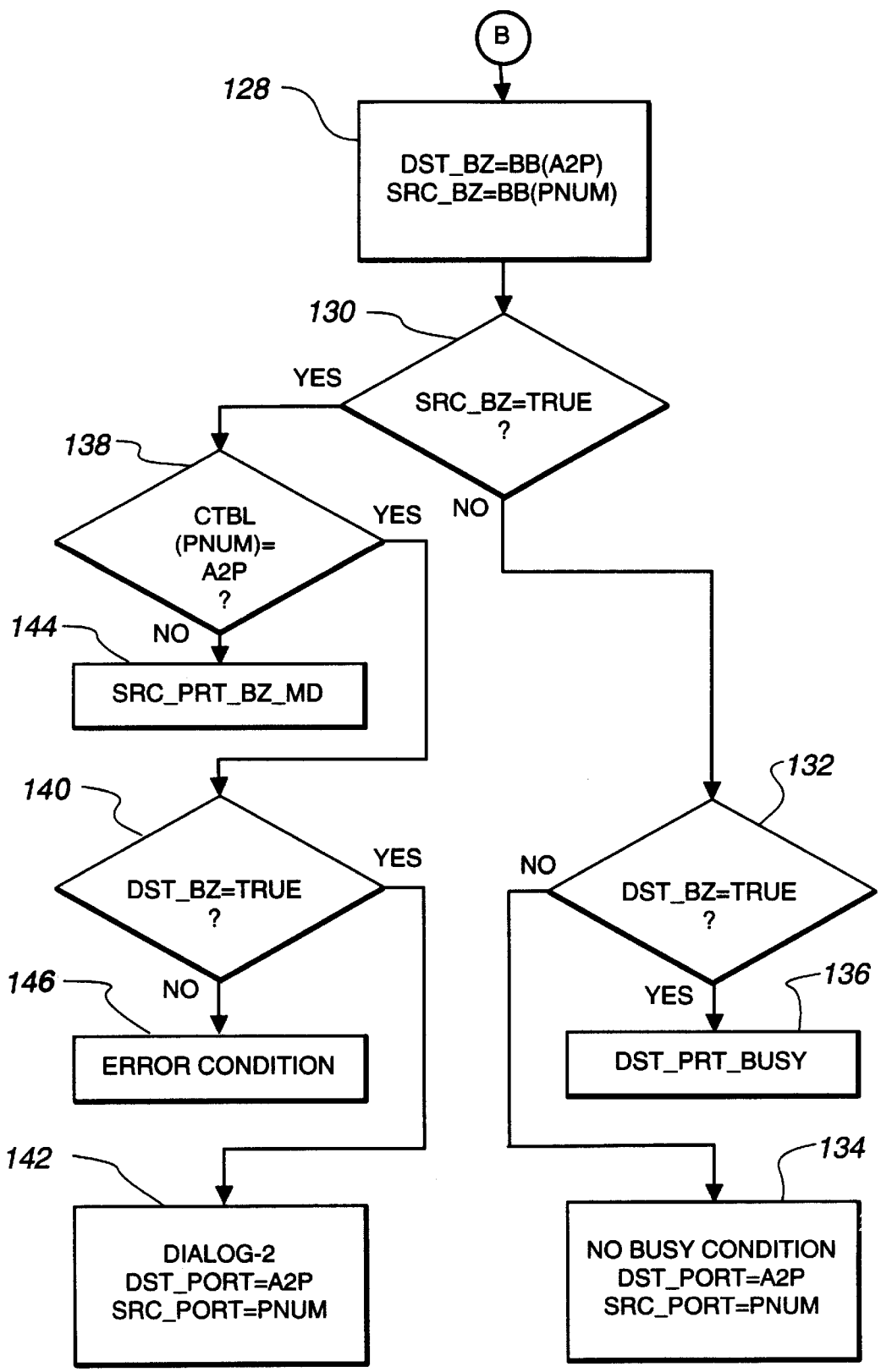

With reference additionally now to FIGS. 2A through 2C, a process 100 for implementing the method and apparatus of the present invention is shown which is implemented by the busy bit array and closely coupled connection table of the present invention as will be more fully described hereinafter. The process 100 implements the busy bit decision cycle ("DEC_CY") beginning at step 102.

At decision step 104, the flags are checked to see if the source is a member of a hunt group ("SRC_HG") and the destination is a member of a hunt group ("DST_HG"). In the particular exemplary implementation of the present invention disclosed herein, if both the source and destination are members of a hunt group, then an error condition is reported at step 106 due to the fact that hunt group to hunt group connection requests are prohibited. In those implementations of the method and apparatus of the present invention in which the connection table lookup were a two dimensional array or a CAM where utilized, this need not be the case.

On the other hand, if the source and destination are not both members of a hunt group, then at decision step 108, a determination is made as to whether or not the source is a member of a hunt group. If it is, then the process 100 proceeds to step 110 where address translation occurs (this implies the lookup of the Busy Bit ("BB") associated with the translated A2P value, "DST_BZ=BB(A2P)") to derive the destination port from the destination address and the group of 8 for the source Busy Bit Array is selected based upon the port member ("SRC_BZ=BB(PNUM_BASE)").

With particular reference to FIG. 2B. thereafter, at decision step 112, a determination is made as to whether or not the destination port is busy ("DST_BZ=True"). If true, then at decision step 114 another check is made to see if the contents of the connect table indexed by the A2P is equal to the base group number ("CTBL(A2P)=BASE")to test for a "Dialog 2" condition wherein the destination port may already be in communication with a group member. At step 116 the Dialog 2 condition is flagged and the group member indicated by the connect table lookup is returned as the source port with the Dialog 2 condition code ("DST_PORT=A2P" and "SRC_PORT=CTBL(A2P)"). Alternatively, at step 118 a response is generated that the destination port is busy ("DST_PRT_BSY").

If at decision step 112 the destination port is not busy, then decision step 120 determines whether or not all members of the hunt group are busy ("ALL HG_MEMBERS_BUSY"). If all of the hunt group members are busy, then there is no path to allocate and a "Source Port Busy Monologue D" ("SRC_PRT_BZ_MD") is returned at step 122. Monologue D is the state returned when a request for connection is raised by a source port (in a Monologue D state) but all ports are already in connection with different destinations. On the other hand, if a member of the hunt group is not busy, then at step 124, a no busy condition is reported, the destination port number is returned ("DST_PRT=A2P") and the lowest available hunt group member that has been selected is returned ("SRC_PORT=Lowest Free HG_MEMBER").

With reference again to decision step 108 shown in FIG. 2A, if the source is not a member of a hunt group, then the process 100 proceeds to decision step 126 to determine if the destination is a member of a hunt group. If it is not, then a conventional process is followed as indicated with specific reference now to FIG. 2C. At step 128, since it has previously been determined that there is no hunt group, the individual busy bits indexed by PNUM and translated A2P value are looked up. At decision step 130, a test is performed to determine if the source is busy ("SRC_BZ=True") and, if it is not, then at decision step 132, the destination is tested to determine if the destination is busy ("DST_BZ=True"). If not, then there is no busy condition and the connection can be accepted and the destination and source port numbers are returned ("DST_PORT=A2P" and "SRC_PORT=PNUM") at step 134. If the destination port is busy, then that condition is returned at step 136 ("DST_PRT_BUSY").

With reference to decision step 130, if the source is busy, then the connection table is accessed at decision step 138 to determine if there is already a connection to the destination (the connect table indexed by PNUM=A2P "CTBL (PNUM)=A2P"). If so, and at decision step 140 the destination is busy ("DST_BZ=True"), then a Dialog 2 condition is reported, both of the ports are busy and connected to each other ("DST_PORT=A2P" and "SRC_PORT=PNUM"). At decision step 138, if CTBL(PNUM) is not equal to A2P, then a Source Port Busy Monologue D condition is reported at step 144. If at step 140, the destination is not busy, then an error condition is reported at step 146.

With reference once again to FIG. 2A, if at decision step 126 the destination is a member of a hunt group, then the source busy bit is indexed off the port number and the destination busy bit is an array of 8 indexed by the A2P (7:3), ("SRC_BZ=BB(PNUM)" and "DST_BZ=BB(A2P_BASE)") at step 148. At decision step 150, if the source is not busy, then at decision step 152, a test is made to determine if all of the destinations are busy ("ALL DST_BZ=True"). If all destinations are busy, then the DST_PRT_BUSY response is provided at step 154. If not, then a no busy condition is reported at step 156, the connection can go through and the source port number ("SRC_PORT=PNUM") and destination port as the lowest available hunt group member ("DST_PORT=Lowest Free HG_MEMBER") is reported At decision step 150, if the source is busy, then at decision step 158, if the connect table indexed by that source is equal to the base of the hunt group, then a Dialog 2 condition exists and the source port number ("SRC_PORT=PNUM") and the group member destination port number ("DST_PORT=CTBL(PNUM)") are returned at step 162. Alternatively, at step 160, a source port busy Monologue D ("SRC_PORT_BZ_MD") condition is reported if the test fails.

Figure 3:
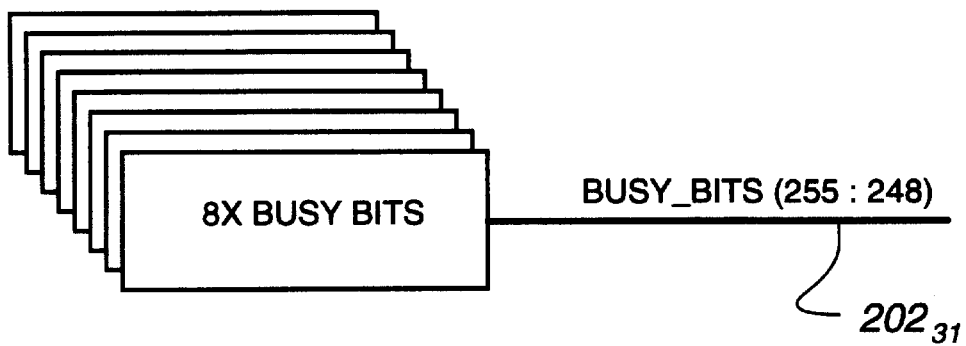
FIG. 3 is a representative illustration of a base group for implementation of the method and apparatus of the present invention showing consecutive hunt groups starting on boundaries of eight for a possible 256 ports.
Figure 3:
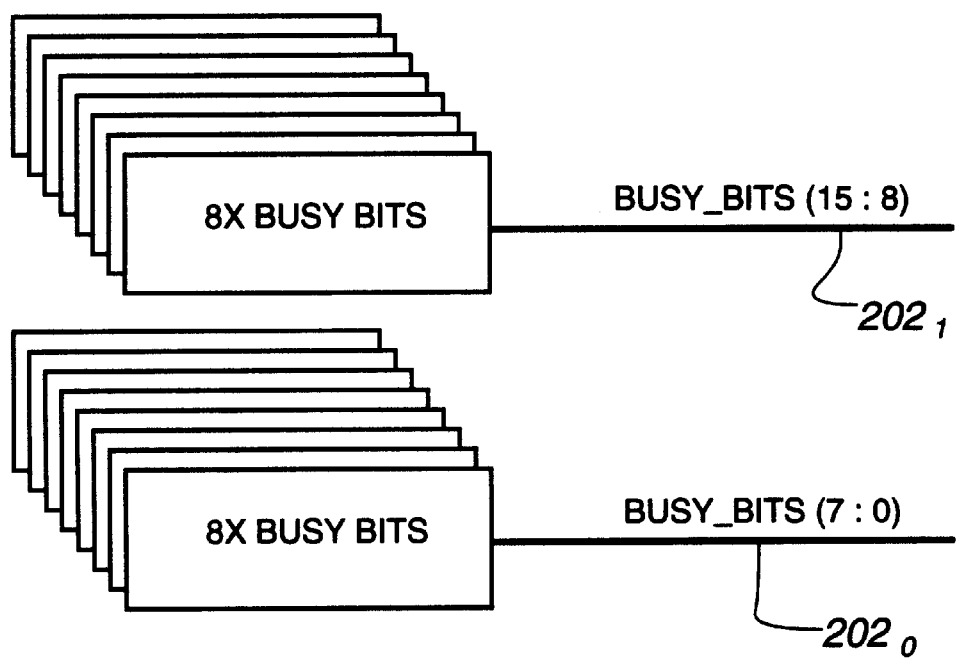

With reference additionally now to FIG. 3, a base group 200 is shown which includes, in the exemplary embodiment shown, 256 ports arranged in consecutive hunt groups starting on boundaries of eight. In other words a first hunt group is associated with a group of busy bits $202_0$ (BUSY_BITS [7:0]),a second hunt group with a group of busy bits $202_1$ (BUSY_BITS [15:8]) through a $32^{nd}$ hunt group with a group of busy bits $202_{31}$ (BUSY_BITS [255:248]).

Figure 4:
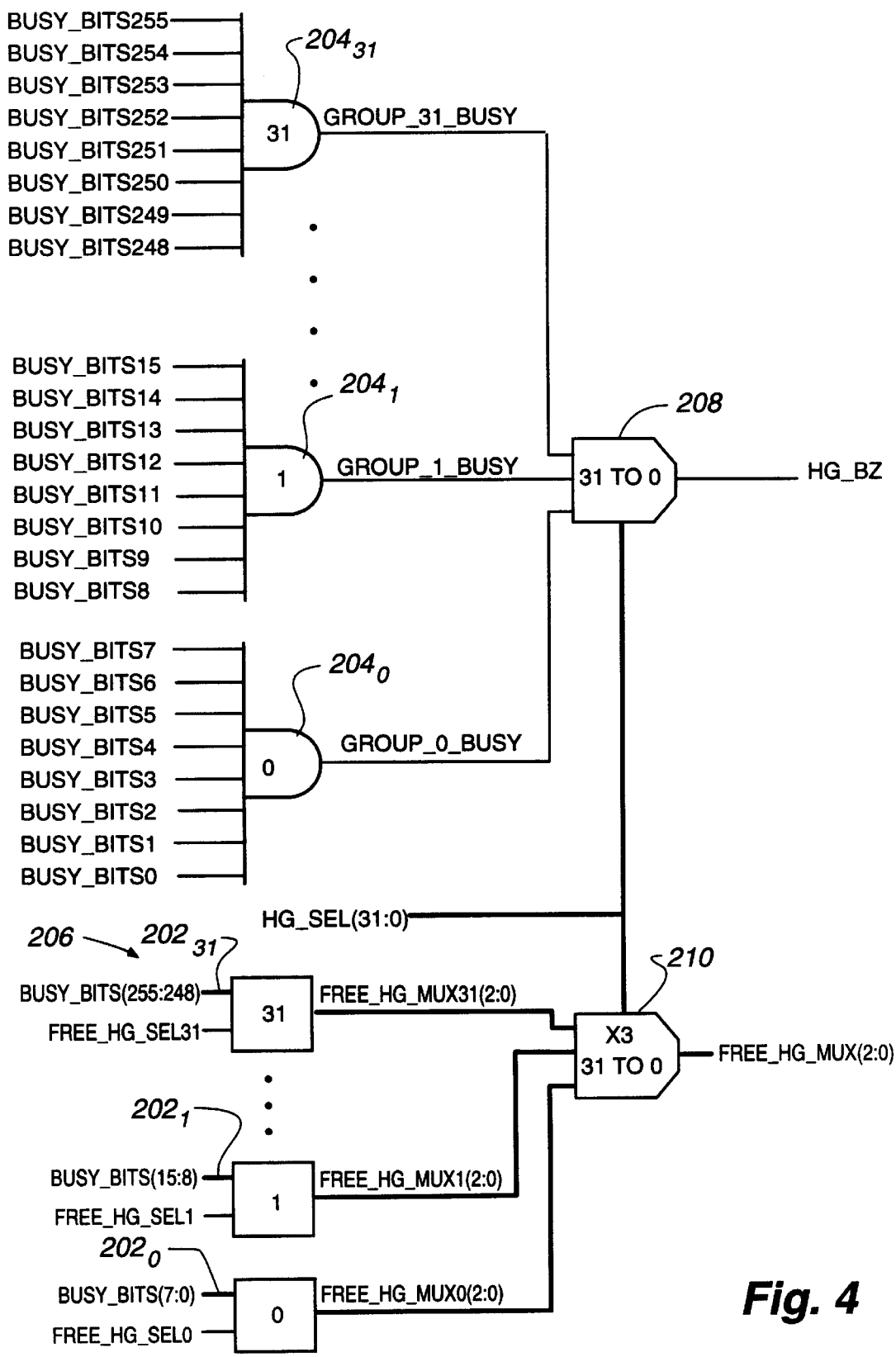
FIG. 4 is a follow-on representative functional block diagram of an apparatus in accordance with the present invention illustrating the hunt group busy logic thereof.

With reference also to FIG. 4, the individual ones of the group of busy bits $202_0$, $202_1$ through $202_{31}$ illustrated in the preceding figure are shown as input to an encoder to select the lowest available member (if necessary) by their input to gates $204_0$, $204_1$ through $204_{31}$ respectively in which they are logic AND'd to derive respective GROUP_0_BUSY, GROUP_1_BUSY through GROUP_32_BUSY outputs for input to a 31-to-0 multiplexer 208. Busy bit groups $202_0$, $202_1$ through $202_{31}$ are also associated with corresponding free hunt group select signals FREE_HG_SEL0, FREE_HG_SEL1 through FREE_HG_SEL_31 in a logic block 206 to provide respective FREE_HG_MUX0[2:0], FREE_HG_MUX1[2:0] through FREE_HG_MUX31 [2:0] inputs to another 31-to-0 multiplexer 210. The multiplexers 208 and 210 are controlled by a number of hunt group select signals HG_SEL[31:0] as shown to provide a hunt group busy signal ("HG_BZ") and a FREE_HG_MUX[2:0] signal.

Functionally, the output of the multiplexer 208 provides a "flag" indicating that all members of a particular hunt group are busy and no connection can be made. The output of the multiplexer 210 is derived, as shown, from the lowest three bits ([2:0]) and indicates which is the lowest available member of the hunt group for connection.

Figure 5A:
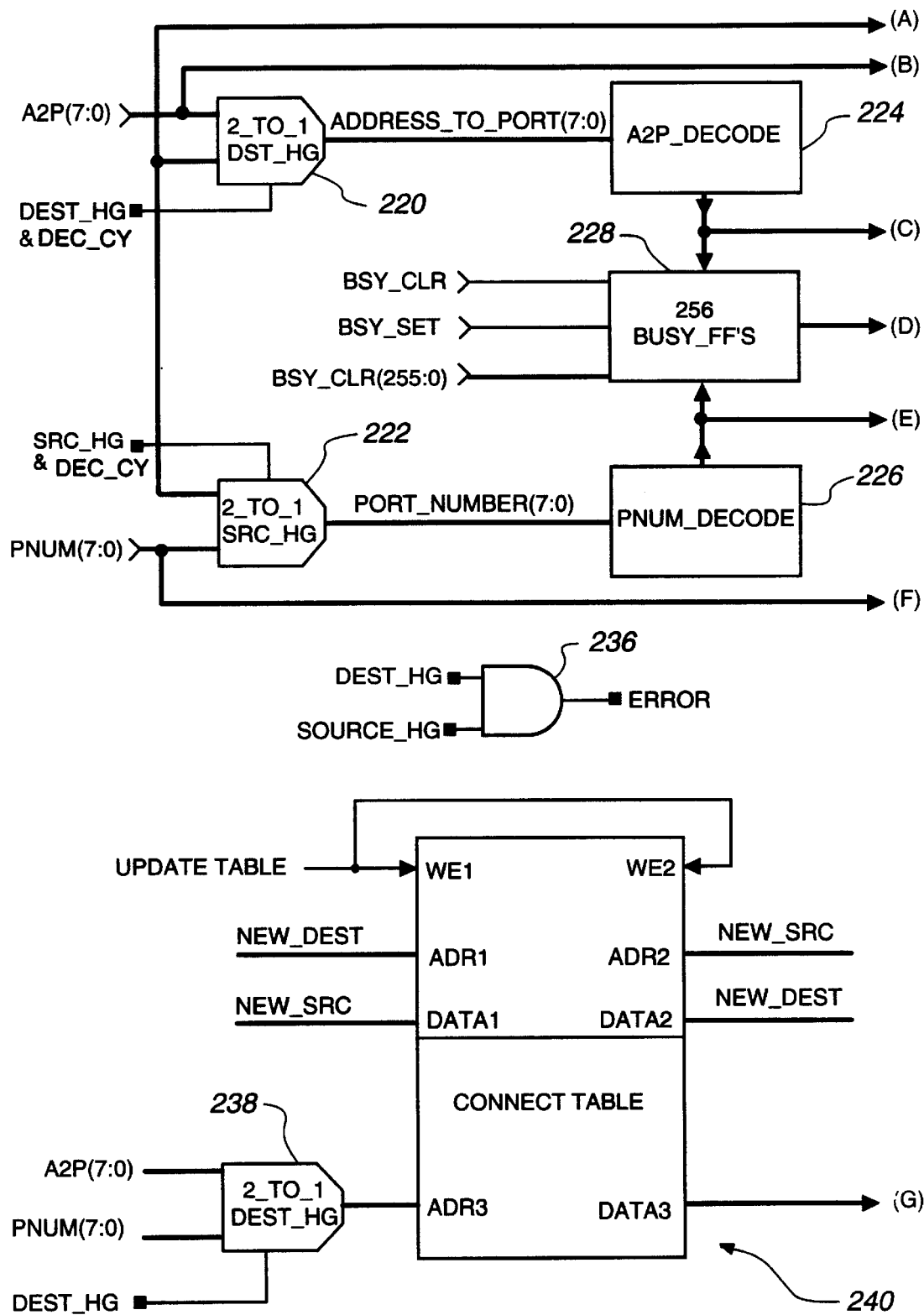
FIGS. 5A and 5B are an additional follow-on representative functional block diagram of the busy array and connect table of the apparatus of the preceding figures and also illustrating the associated compare logic.
Figure 5B:
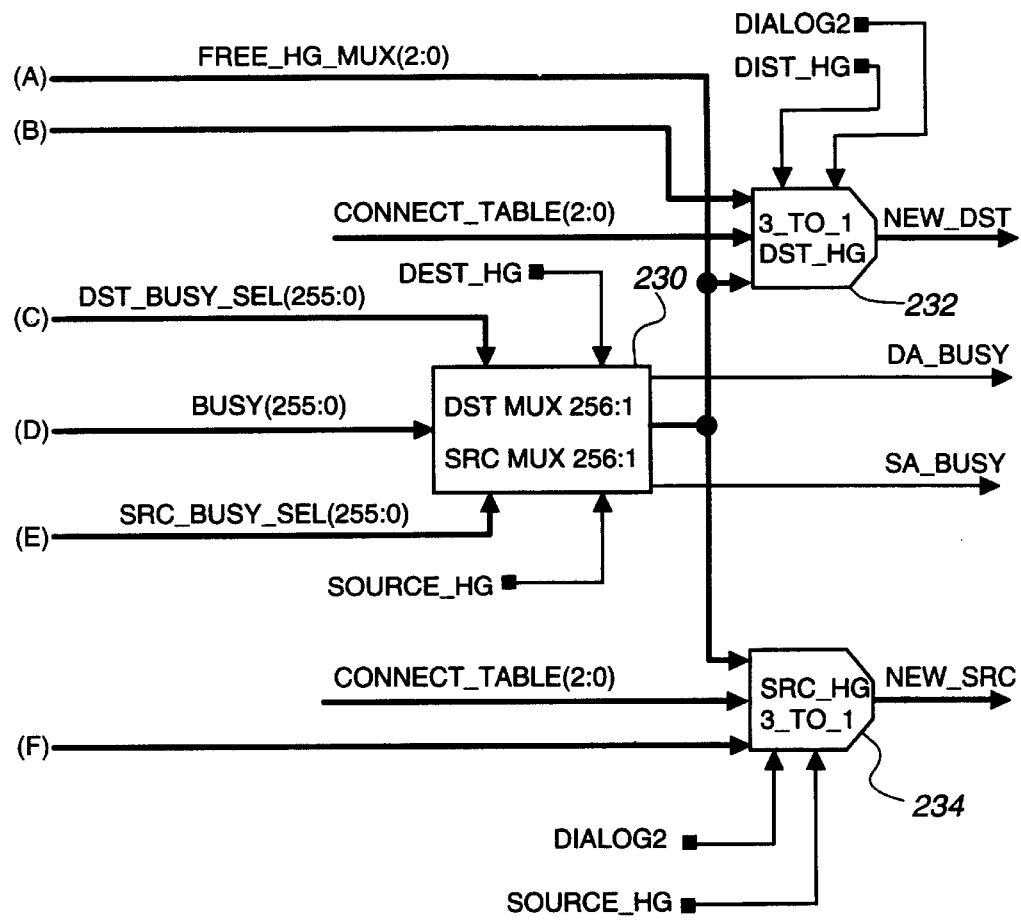
Figure 5B:
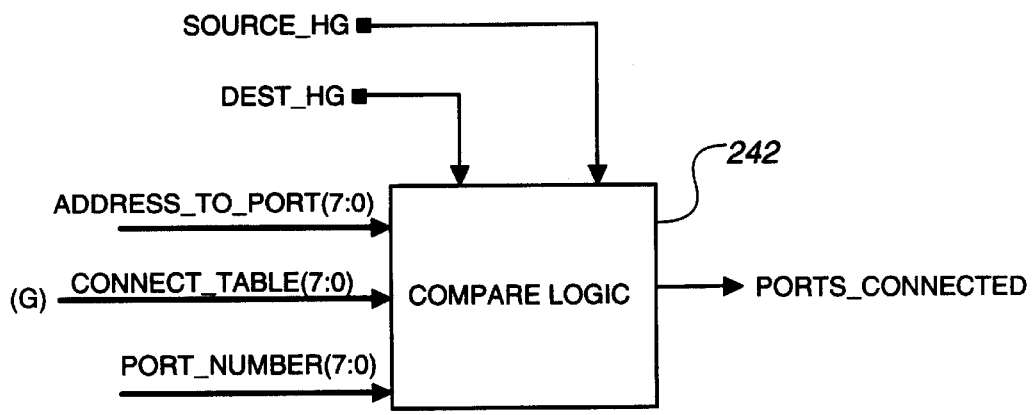

With reference additionally now to FIGS. 5A and 5B, additional logic blocks for implementing the method and apparatus of the present invention are shown. Eight bits A2P[7:0] are provided as input to one input of a 2-to-1 DST_HG multiplexer 220 which is controlled by a DST_HG & DEC_CY input. In like manner, eight bits PNUM [7:0] are supplied as input to one input of a 2-to-1 SRC_HG multiplexer 222 which is controlled by a SRC_HG & DEC_CY input. The output of multiplexer 220 (ADDRESS_TO_PORT[7:0]), is input to an A2P decoder 224 which, in turn provides a DST_BUSY_SEL[255:0] signal to BUSY_FF block 228 and to DST/SRC_MUX 230. Similarly, the output of multiplexer 222 (PORT_NUMBER[7:0]) is input to PNUM decoder 226 which, in turn, provides a SRC_BUSY_SEL[255:0] signal to the BUSY_FF block 228 and the corresponding portion of the DST/SRC_MUX 230. As shown, the BUSY_FF block 228 has as inputs a PROC_BSY_CLR, BSY_SET and BSY_CLR[255:0] signals and also provides a BUSY[255:0] signal to the DST/SRC_MUX 230 which has a DEST_HG and SOURCE_HG signals as additional inputs.

The DST/SRC_MUX 230 provides a FREE_HG_MUX [2:0] input to the multiplexers 220 and 222 as well as to multiplexers 232 and 234. The multiplexer 232 is a 3_to_1 DST_HG multiplexer which also has as inputs the A2P[7:0] signal, and a CONNECT_TABLE[2:0] signal. It has DIALOG2 and DEST_HG control inputs to provide a NEW_DEST output. Correspondingly, the multiplexer 234 is a 3_to_1 SRC_HG multiplexer which has as additional inputs the PNUM[7:0] signal and the CONNECT_TABLE [2:0] signal. It is controlled by the DIALOG2 signal and a SRC_HG signal to provide a NEW_SRC output. The multiplexers 220 and 222 serve to multiplex the lower three bits based on the hunt group and connect while the multiplexers 232 and 234 multiplex the lower three bits based on the hunt group and Dialog 2.

The A2P[7:0] and PNUM[7:0] inputs are also supplied to a 2_to_1 DST_HG multiplexer 238 which has a DST_HG control input. The output of the multiplexer 238 is coupled to the ADR3 terminals of the connect table 240, which has its ADR1 and ADR2 terminals coupled to the NEW_DEST and NEW_SRC outputs of multiplexers 232 and 234 respectively. The DATA1 and DATA2 terminals of the connect table 240 are likewise coupled to the NEW_SRC and NEW_DEST outputs of multiplexers 234 and 232 respectively. The write enable inputs WE1 and WE2 of the connect table 240 are coupled to receive an UPDATE_TABLE signal as shown. The DATA3 terminals of the connect table 240 are supplied a one input to compare logic 242 which also has an A2P[7:0] and PORT_NUMBER[7:0] inputs. The compare logic 242 also has a SRC_HG and DST_HG control inputs and provides a PORTS_CONNECTED output. The compare logic 242 is operational such that the SOURCE_HG ports are connected when PORT_NUMBER corresponds to CONNECT_TABLE [7:3], the DST_HG ports are connected when the address to port corresponds to CONNECT_TABLE[7:3] and NO_HG ports are connected when A2P corresponds to CONNECT_TABLE.

In the particular embodiment illustrated wherein hunt group to hunt group connections are not implemented, also shown is an AND gate 236 which provides an error condition output if both a DST_HG and SRC_HG signals are received as previously described.

In operation, the elements shown implement a portion of the decision logic of the method and apparatus of the present invention and the compare logic 242 indicates whether or not the ports are connected. That is, if one of the ports is a member of a hunt group, the connect table 240 and compare logic 242 are operational to indicate that the port is already connected to the port to which the connection is being requested. The outputs of the multiplexers 232 and 234 return a new destination and source port number respectively which absent the implementation of hunt groups would merely be the output of a conventional translation table in one-to-one type of port mapping.

Figure 6:
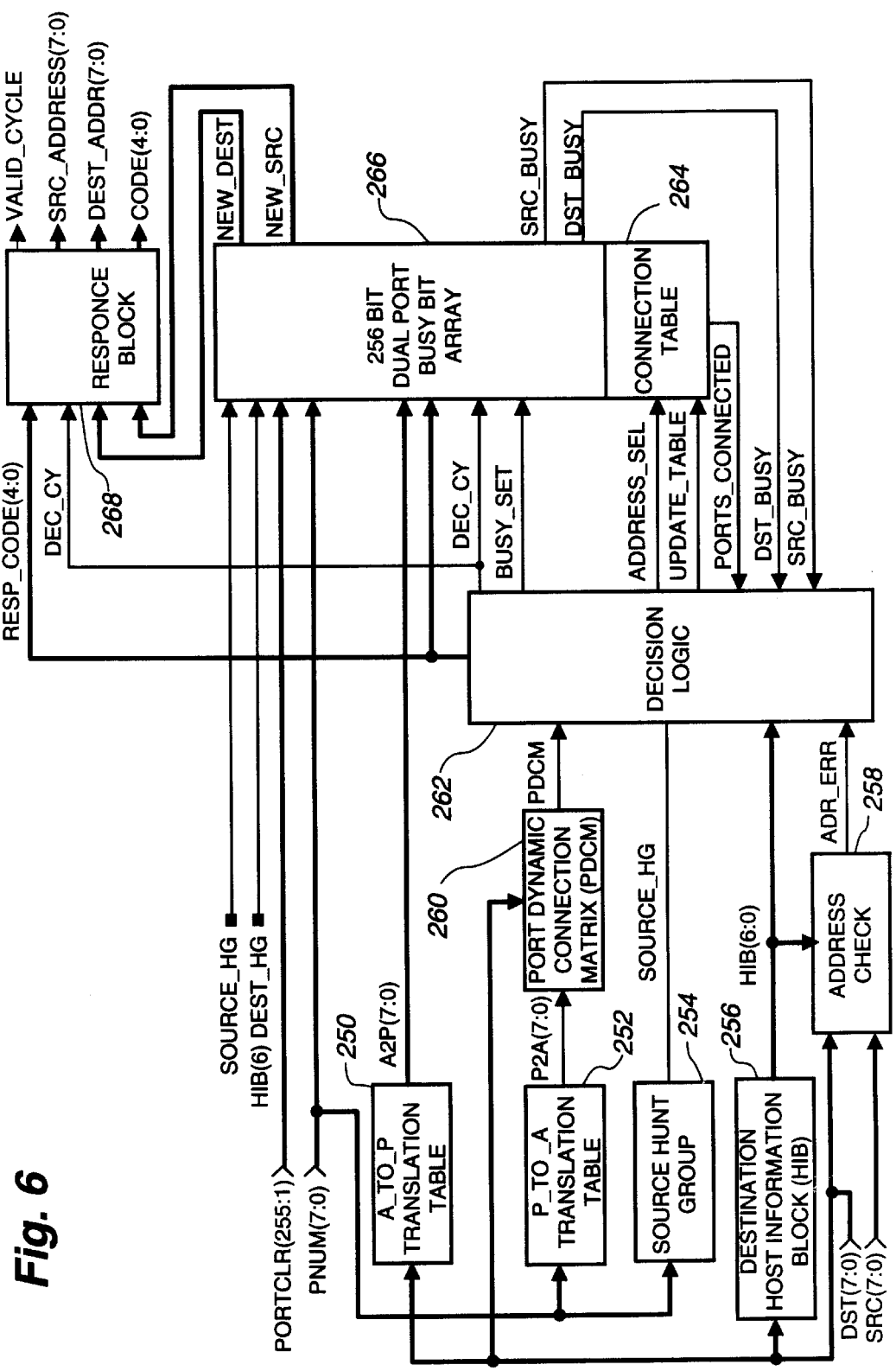
FIG. 6 is a higher level representative functional block diagram of the elements of the preceding figure illustrating the decision logic, thereof as well as the close coupling between the busy bit array and the connection table.

With reference additionally now to FIG. 6, a higher level view of the logic blocks of the preceding figure is shown with greater detail of the implementing decision logic. A DST[7:0] input is supplied to a A2P translation table 250, a destination host (or hardware) information block ("HIB") 256 and an address check block 258. The address check block 258 also receives a SRC[7:0] input as shown in addition to an HIB[6:0] output from the HIB 256.

A PORTCLR[255:0] signal is input to a 256 bit dual-port busy bit array 266 in addition to a PNUM[7:0] signal which is also supplied as input to a P2A translation table 252 and a source hunt group block 254. The output of the P2A translation table 252 ("P2A[7:0]") and the DST[7:0] signals are supplied as input to a port dynamic connection matrix ("PDCM") 260 to provide a PDCM signal to the decision logic 262 along with a SRC_HG signal from the source hunt group block 254. The decision logic 262 also has as inputs the HIB[6:0] signal and an ADR_ERR output of the address check block 258.

The busy bit array 266 receives as inputs the A2P[7:0] output of the A2P translation table 250 as well as SRC_HG and HIB[6] DST_HG signals. The decision logic 262 provides DEC_CY and BUSY_SET inputs to the busy bit array as well as a RESP_CODE[4:0] signal. The DEC_CY and RESP_CODE[4:0] signals are also supplied as inputs to a response block 268 which will be more fully described hereinafter.

The decision logic 262 also provides ADDRESS_SEL and UPDATE_TABLE inputs to a connection table 264 which is closely coupled to the busy bit array 266. In turn, the connection table 264 provides a PORTS_CONNECTED signal back to the decision logic 262. The busy bit array 266 supplies a SRC_BUSY and DST_BUSY inputs to the decision logic 262 as well as the NEW_DEST and NEW_SRC inputs to the response block 268. The response block 268 provides a VALID_CYCLE, DEST_ADDR[7:0], SRC_ADDRESS[7:0] and CODE[4:0] outputs.

Functionally, a bit in the HIB 256 previously not utilized in one-to-one port attachment schemes is used to indicate whether or not the destination port is a member of a hunt group. The address check block 258 performs various address checks and provides that information to the decision logic 262. The PDCM 260 functions as a type of filter and indicates to the decision logic 262 whether or not two ports are allowed to enter into connection. The decision logic 262 is also provided with information on whether or not a particular source or destination is busy from the busy bit array 266 and then allows or disallows a connection between them. If a connection is allowed, the connection table 264 is updated and the address is selected. Once a connection is established, the corresponding busy bits are set in the busy bit array 266 and the appropriate response code is sent, all as indicated in the flow chart of FIGS. 2A through 2C.

While there have been described above the principles of the present invention in conjunction with specific apparatus and methods, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for coupling a first data bus to a second data bus, comprising:

defining a plurality of ports through which said first data bus may be selectively coupled to a first side of a crosspoint switch;

identifying a first available port of said plurality of ports;

coupling said first data bus through said first available port to said crosspoint switch for connection to a port associated with said second data bus, and if said port associated with said second data port is indicated to be busy, determining if said port associated with said second data bus is indicated to be busy due to an attempt to establish a connection to said port through which said first bus is coupled to said switch, and, if so, allowing a connection therebetween to be established.

2. The method of claim 1 further comprising arranging a subset of said ports into a hunt group, and wherein said defining is carried out by assigning an attribute to each of said ports in said hunt group indicative of hunt group membership.

3. The method of claim 1 wherein said defining is carried out by sequentially organizing said first plurality of ports 4 into a multiplicity of subsets.

4. The method of claim 3 wherein said step of sequentially organizing is carried out by dividing said plurality of ports into groupings of eight ports.

5. The method of claim 1 wherein said plurality of ports through which said first data bus may be selectively coupled comprise a source port and said port associated with said second data bus is a destination port.

6. A crosspoint controller for coupling a first data bus to a second data bus, comprising:

a switch having an input and output;

a plurality of input member ports coupled between said first data bus and said switch input, wherein said first data bus is coupled to said switch input through a first member port if available and alternatively through a next available member port if said first member port is not available; and at least one output port coupled between said switch output and said second data bus; and a circuit for determining if said port associated with said output port is busy due to an attempt to establish a connection to said input port through which said first data bus is coupled to said switch, and, if said port associated with said output port is busy, allowing a connection therebetween to be established.

7. The crosspoint controller of claim 6 wherein said first and second data buses are fibre channel buses.

8. The crosspoint controller of claim 6 wherein said switch is an ESCON switch.

9. The crosspoint controller of claim 6 wherein said plurality of input member ports are arranged into a hunt group which comprises eight consecutive member ports.

10. The crosspoint controller of claim 6 wherein said first member port is a lowest numbered port and said next available member port is a next lowest numbered port.

11. The crosspoint controller of claim 6 wherein said member ports have at least one common attribute bit.

12. A crosspoint controller for coupling a first data bus to a second data bus, comprising:

a switch having an input and output;

a plurality of output member ports coupled between said switch output and said second data bus, wherein said switch output is coupled to said second data bus through a first member port if available and alternatively through a next available member port if said first member port is not available; and at least one input port coupled between said first data bus and said switch input; and a circuit for determining whether said output member port to which said switch output is coupled is busy due to an attempt by an input port seeking to establish contact thereto, if so, allowing a connection therebetween to be established.

13. The crosspoint controller of claim 12, wherein said first and second data buses are fibre channel buses.

14. The crosspoint controller of claim 12 wherein said switch is an ESCON switch.

15. The crosspoint controller of claim 12 wherein said plurality of output member ports are arranged into a hunt group comprising eight consecutive member ports.

16. The crosspoint controller of claim 12 wherein said first member port is a lowest numbered port and said next available member port is a next lowest numbered member port.

17. The crosspoint controller of claim 12 wherein said member ports have at least one common attribute bit.

18. A method for coupling a first data bus to a second data bus through a source port to a destination port path, comprising:

determining if either said source port or said destination port is a member of one of a plurality of predefined source and destination hunt groups respectively;

coupling a first available member of said source hunt group to said destination port if said source port is a member of one of said plurality of predefined source hunt groups;

coupling a first available member of said destination hunt group to said source port if said destination port is a member of one of said plurality of predefined destination hunt groups;

and if said destination port is busy, determining if said source port is busy due to an attempt to establish a connection to said destination, and, if so, allowing a connection therebetween to be established.

19. The method of claim 18 wherein said coupling a first available member of said source hunt group to said destination port and coupling a first available member of said destination hunt group to said source port are implemented alternatively.

20. The method of claim 18 further comprising:

returning a source port busy signal if all members of said source hunt group are busy.

21. The method of claim 20 further comprising:

also returning a destination port busy signal if said destination port is not a member of a destination hunt group and said destination port is busy.

22. The method of claim 20 wherein said (step of) returning is carried out by indexing a busy bit array to determine which members of said source hunt group are busy.

23. The method of claim 19 further comprising returning a destination port busy signal if all members of said destination hunt group are busy.

24. The method of claim 23 further comprising also returning a source port busy signal if said source port is not a member of a source hunt group and said source port is busy.

25. The method of claim 23 wherein said (step of) returning is carried out by indexing a busy bit array to determine which members of said destination hunt group are busy.

26. The method of claim 18 wherein said (step of) coupling a first available member of said source hunt group to said destination port comprises:

sequentially ordering said members of said source hunt group; and selecting a lowest ordered free member of said source hunt group as said first available member.

27. The method of claim 18 wherein said (step of) coupling a first available member of said destination hunt group to said source port comprises:

sequentially ordering said members of said destination hunt group; and selecting a lowest ordered free member of said destination hunt group as said first available member.

* * * * *